US011714742B2

(12) United States Patent
Barve et al.

(10) Patent No.: US 11,714,742 B2
(45) Date of Patent: Aug. 1, 2023

(54) SYNTHESIZING PRINTF AND SCANF STATEMENTS FOR GENERATING DEBUG MESSAGES IN HIGH-LEVEL SYNTHESIS (HLS) CODE

(71) Applicant: Tata Consultancy Services Limited, Mumbai (IN)

(72) Inventors: Mahesh Damodar Barve, Pune (IN); Sunil Anant Puranik, Pune (IN); Manoj Karunakara Nambiar, Thane West (IN); Swapnil Shashikant Rodi, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 358 days.

(21) Appl. No.: 17/123,924

(22) Filed: Dec. 16, 2020

(65) Prior Publication Data

US 2021/0232486 A1      Jul. 29, 2021

(30) Foreign Application Priority Data

Jan. 28, 2020   (IN) .............................. 202021003760

(51) Int. Cl.
  *G06F 11/36* (2006.01)
  *G06F 13/28* (2006.01)
  *G06F 13/42* (2006.01)
(52) U.S. Cl.
  CPC ........ *G06F 11/364* (2013.01); *G06F 11/3648* (2013.01); *G06F 13/28* (2013.01); *G06F 13/4282* (2013.01); *G06F 2213/0026* (2013.01)
(58) Field of Classification Search
  None
  See application file for complete search history.

(56) References Cited

U.S. PATENT DOCUMENTS

| 10,198,540 | B1* | 2/2019 | Cohen ................. G06F 30/3312 |
| 2001/0034876 | A1* | 10/2001 | Panchul ................. G06F 30/30 716/102 |

(Continued)

OTHER PUBLICATIONS

J. Goeders and S. J. E. Wilton, "Effective FPGA debug for high-level synthesis generated circuits," 2014 24th International Conference on Field Programmable Logic and Applications (FPL), Munich, Germany, 2014, pp. 1-8, doi: 10.1109/FPL.2014.6927498. (Year: 2014).*

(Continued)

*Primary Examiner* — Andrew M. Lyons
(74) *Attorney, Agent, or Firm* — Finnegan, Henderson, Farabow, Garrett & Dunner LLP (57) ABSTRACT

High level synthesis (HLS) begins with high-level specification of a problem, where behavior is generally decoupled from e.g., clock-level timing. Programming code can be run and debugged during functional simulation using debugging techniques. However, it is not possible to understand execution flow of register transfer level instructions (RTL) generated during RTL debug. Conventionally, it is challenging and not possible due to nature of debugging techniques which ignore printf statements in code for invocation. Systems and methods of present disclosure synthesize printf and/or scanf statements for generating debug messages in HLS code, wherein printf and/or scanf statements is/are included before/after function(s) in sections comprising instructions in code and synthesized as a block during run-time which communicate with host system and debug messages are generated for display on screen. This enables traceability of the code execution on the screen and printf/scanf statements output can be observed without any challenges.

15 Claims, 5 Drawing Sheets

(56) References Cited

U.S. PATENT DOCUMENTS

| | | | | |
|---|---|---|---|---|
| 2010/0131934 A1* | 5/2010 | Kim | ........................ | G06F 30/30 |
| | | | | 717/137 |
| 2014/0351795 A1* | 11/2014 | Alfieri | ..................... | G06F 30/33 |
| | | | | 717/125 |
| 2016/0266623 A1* | 9/2016 | Ito | ............................. | G06F 1/24 |
| 2018/0267706 A1* | 9/2018 | Li | ........................... | G06F 3/061 |

OTHER PUBLICATIONS

D. Kim, C. Celio, S. Karandikar, D. Biancolin, J. Bachrach & K. Asanovic, "DESSERT: Debugging RTL Effectively with State Snapshotting for Error Replays across Trillions of Cycles," 2018 28th Int'l Conf. on Field Programmable Logic and Applications (FPL), Dublin, Ireland, 2018, pp. 76-80. (Year: 2018).*

"Debugging HLS cosim and hardware problems", High-Level Synthesis, 2012, xilinx.com, https://www.xilinx.com/support/documentation/sw_manuals/xilinx2012_2/ug902-vivado-high-level-synthesis.pdf.

"Vivado Design Suite User Guide High-Level Synthesis", High-Level Synthesis, 2018, xilinx.com https://www.xilinx.com/support/documentation/sw_manuals/xilinx2017_4/ug902-vivado-high-level-synthesis.pdf.

\* cited by examiner

SYNTHESIZING PRINTF AND SCANF STATEMENTS FOR GENERATING DEBUG MESSAGES IN HIGH-LEVEL SYNTHESIS (HLS) CODE

PRIORITY CLAIM

This U.S. patent application claims priority under 35 U.S.C. § 119 to: India Application No. 202021003760, filed on Jan. 28, 2020. The entire contents of the aforementioned application are incorporated herein by reference.

TECHNICAL FIELD

The disclosure herein generally relates to debugging techniques, and, more particularly, to synthesizing printf and scanf statements for generating debug messages in High-Level Synthesis (HLS) code.

BACKGROUND

High-Level Synthesis (HLS) is a design process where algorithmic description of hardware is converted to low level register transfer language (RTL) code. Synthesis begins with a high-level specification of a problem, where behavior is generally decoupled from e.g., clock-level timing. Typical languages for specifying the behavior include C, C++, SystemC, simulator such as MATLAB, and the like. Code written in any of these languages is analyzed, architecturally constrained, and scheduled to trans-compile into a register-transfer level/register transfer language (RTL) design in a hardware description language (HDL). This is in turn commonly synthesized to gate level by use of a logic synthesis tool. The goal of HLS is to let hardware designers efficiently build and verify hardware, by giving them better control over optimization of their design architecture, and through the nature of allowing the designer to describe the design at a higher level of abstraction while the tool does the RTL implementation. Verification of the RTL is an important part of the process. However, there are few challenges in the existing approaches. As discussed above, typically, the code is written in C or C++. From this code, a RTL code (Verilog or VHDL) is generated. The C code can be run and debugged during functional simulation using debugging techniques such as printf and/or scanf statements. Problem arises when one wants to debug the RTL during run-time to understand execution flow of the RTL generated. This in typical approaches is challenging and not possible due to the nature of printf and/or scanf statements. Thus, when the RTL is generated, wherein sample data is given to the RTL, it is not possible to see the values in printf/scanf on screen. This is because, the RTL generator ignores printf/scanf calls.

SUMMARY

Embodiments of the present disclosure present technological improvements as solutions to one or more of the above-mentioned technical problems recognized by the inventors in conventional systems. For example, in one aspect, there is provided a processor implemented method for synthesizing printf and scanf statements for generating debug messages in High-Level Synthesis (HLS) code. The method comprises obtaining, via one or more hardware processors, a machine programming language (MPL) code from a user, wherein the MPL code comprises at least one of one or more printf statements and one or more scanf statements for debugging the MPL code; converting, via a synthesizable logic, the MPL code comprising the at least one of one or more printf statements and one or more scanf statements to register transfer language (RTL) instructions, wherein the RTL instructions comprises a logic; and synthesizing, at run-time, the at least one of one or more printf statements and one or more scanf statements by: executing, via the one or more hardware processors, the logic, wherein the logic when executed interacts with a local field-programmable gate array (FPGA) memory and writes one or more debug messages on the local FPGA memory; transmitting, via the one or more hardware processors, the one or more written debug messages to a Direct Memory Access (DMA) block; transmitting, via the one or more hardware processors, the one or more written debug messages by the DMA block to a host memory based on an interaction of the DMA block with a controller; and writing, via a device driver executed by the one or more hardware processors, the one or more transmitted debug messages to a file system, wherein an output file is generated that comprises the one or more debug messages, wherein a debug message reader reads the one or more debug messages and prints the one or more debug messages thereof, and wherein the printed one or more debug messages are indicative of (i) an execution flow of the (RTL) instructions, and (ii) one or more values associated with one or more parameters comprised in the (RTL) instructions.

In an embodiment, the one or more printf statements are one or more High-level synthesis (HLS) printf statements, and the one or more scanf statements are one or more HLS scanf statements.

In an embodiment, the one or more printf statements and the one or more scanf statements are specified before or after at least one of (i) one or more functions and (ii) one or more sections having instructions comprised in the MPL code.

In an embodiment, the controller is a peripheral component interconnect express (PCI-e) hard macro controller.

In an embodiment, the one or more debug messages are written in a High-level synthesis (HLS) code.

In another aspect, there is provided a system for synthesizing printf and scanf statements for generating debug messages in High-Level Synthesis (HLS) code. The system comprises: a memory storing instructions; one or more communication interfaces; and one or more hardware processors coupled to the memory via the one or more communication interfaces, wherein the one or more hardware processors are configured by the instructions to: obtain a machine programming language (MPL) code from a user, wherein the MPL code comprises at least one of one or more printf statements one or more scanf statements for debugging the MPL code. The system further comprises a synthesizable logic that converts the MPL code comprising the at least one of one or more printf statements and one or more scanf statements to register transfer language (RTL) instructions, wherein the RTL instructions comprises a logic. The one or more hardware processors synthesize, at run-time, the at least one of one or more printf statements and one or more scanf statements by: executing, the logic, wherein the logic when executed interacts with a local field-programmable gate array (FPGA) memory and writes one or more debug messages on the local FPGA memory; transmit the one or more written debug messages to a Direct Memory Access (DMA) block; transmit the one or more written debug messages by the DMA block to a host memory based on an interaction of the DMA block with a controller; and write, via a device driver executed by the one or more hardware processors, the one or more transmitted debug messages to a file system, wherein an output file is generated that comprises the one or more debug messages, wherein a debug message reader comprised in the system reads the one or more debug messages and prints the one or more debug messages thereof at run time, and wherein the printed one or more debug messages are indicative of (i) an execution flow of the (RTL) instructions at run time, and (ii) one or more values associated with one or more parameters comprised in the (RTL) instructions.

In an embodiment, the one or more printf statements are one or more High-level synthesis (HLS) printf statements, and the one or more scanf statements are one or more HLS scanf statements.

In an embodiment, the one or more printf statements and the one or more scanf statements are specified before or after at least one of (i) one or more functions and (ii) one or more sections having instructions comprised in the MPL code.

In an embodiment, the controller is a peripheral component interconnect express (PCI-e) hard macro controller.

In an embodiment, the one or more debug messages are written in a High-level synthesis (HLS) code.

In yet another aspect, there are provided one or more non-transitory machine-readable information storage mediums comprising one or more instructions which when executed by one or more hardware processors cause synthesizing printf statements for generating debug messages in High-Level Synthesis (HLS) code by obtaining, via the one or more hardware processors, a machine programming language (MPL) code from a user, wherein the MPL code comprises the at least one of one or more printf statements and one or more scanf statements for debugging the MPL code. The instructions further cause converting, via a synthesizable logic, the MPL code comprising the at least one of one or more printf statements and one or more scanf statements to register transfer language (RTL) instructions, wherein the RTL instructions comprises a logic; and synthesizing, at run-time, the at least one of one or more printf statements and one or more scanf statements by: executing, via the one or more hardware processors, the logic, wherein the logic when executed interacts with a local field-programmable gate array (FPGA) memory and writes one or more debug messages on the local FPGA memory; transmitting, via the one or more hardware processors, the one or more written debug messages to a Direct Memory Access (DMA) block; transmitting, via the one or more hardware processors, the one or more written debug messages by the DMA block to a host memory based on an interaction of the DMA block with a controller; and writing, via a device driver executed by the one or more hardware processors, the one or more transmitted debug messages to a file system, wherein an output file is generated that comprises the one or more debug messages, wherein a debug message reader reads the one or more debug messages and prints the one or more debug messages thereof, and wherein the printed one or more debug messages are indicative of (i) an execution flow of the (RTL) instructions, and (ii) one or more values associated with one or more parameters comprised in the (RTL) instructions.

In an embodiment, the one or more printf statements are one or more High-level synthesis (HLS) printf statements, and the one or more scanf statements are one or more High-level synthesis (HLS) scanf statements.

In an embodiment, the one or more printf statements and the one or more scanf statements are specified before or after at least one of (i) one or more functions and (ii) one or more sections having instructions comprised in the MPL code.

In an embodiment, the controller is a peripheral component interconnect express (PCI-e) hard macro controller.

In an embodiment, the one or more debug messages are written in a High-level synthesis (HLS) code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Figure 1:
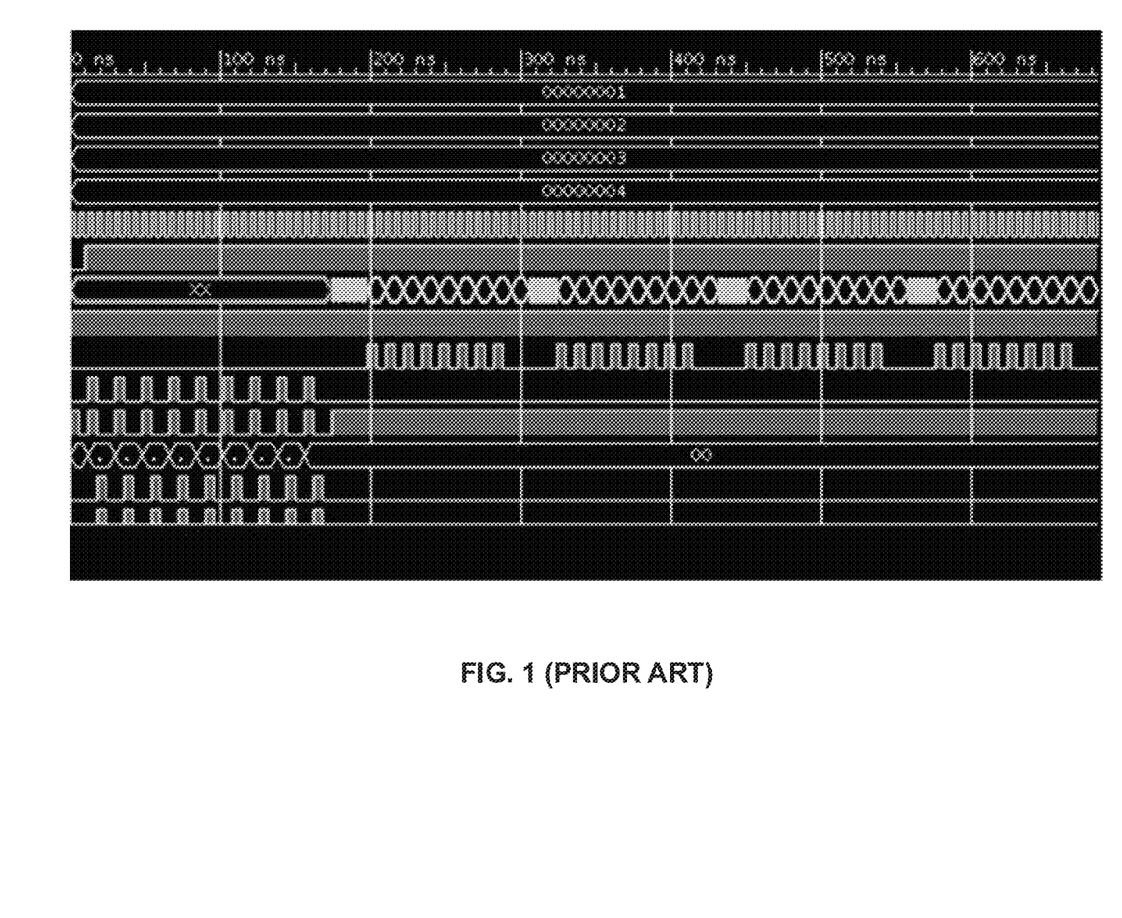
FIG. 1 depicts a conventional method of depicting an output on a display screen for a programming language code.

As discussed above, High-Level Synthesis (HLS) is a design process where algorithmic description of hardware is converted low level RTL code. Synthesis begins with a high-level specification of a problem, where behavior is generally decoupled from e.g., clock-level timing. Typical languages for specifying the behavior include C, C++, SystemC, simulator such as MATLAB and the like, wherein from this code a Verilog code is generated. The C code can be run and debugged during functional simulation using debugging techniques such as printf and/or scanf statements. However, it is not possible to understand execution flow of the RTL generated during the debugging of RTL. This in typical approaches is challenging and not possible due to the nature of printf statements. Thus, when the RTL is generated, and sample data is given to the RTL, it is not possible to see the values in printf on screen. This is because, the RTL generator ignores printf calls. In this regard, FIG. 1 depicts a conventional method of depicting an output on a display screen for a programming language code.

To overcome the above technical problem and to understand what went wrong/incorrect and where, embodiments of the present disclosure provide systems and methods for synthesizing printf and/or scanf statements for generating debug messages in High-Level Synthesis (HLS) code. More specifically, in the present disclosure, the printf and/or scanf statement(s) is/are synthesized as a block during run-time which communicate with a host system (or system as described herein) and debug messages are generated which are displayed on a console. Thus, in the present disclosure, the printf and/or scanf statement(s) is/are included before or after function(s) or sections comprising instructions in the code such that traceability of the code execution on the screen is easily achieved and the printf statement output can be observed without any challenges.

Referring now to the drawings, and more particularly to FIGS. 2 through 4C, where similar reference characters denote corresponding features consistently throughout the figures, there are shown preferred embodiments and these embodiments are described in the context of the following exemplary system and/or method.

Figure 2:
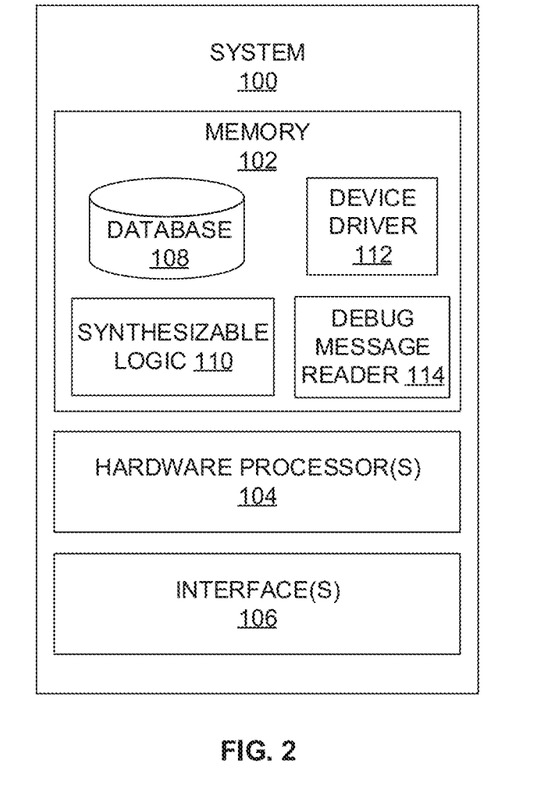
FIG. 2 depicts an exemplary block diagram of a system for synthesizing at least one of printf and scanf statements for generating debug messages in High-Level Synthesis (HLS) code, in accordance with an embodiment of the present disclosure.

FIG. 2 depicts an exemplary block diagram of a system 100 for synthesizing at least one of printf and scanf statements for generating debug messages in High-Level Synthesis (HLS) code, in accordance with an embodiment of the present disclosure. The system 100 may also be referred as 'synthesizing system', or 'a synthesizer' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, debug messages, error(s) identified during execution of machine programming language (MPL) code in run-time, execution flow of register transfer language/register transfer level (RTL) instructions and the like.

In an embodiment, the memory 102 may store (or stores) machine programming language (MPL) code written in any of languages (e.g., C, C++, System C, simulator such as MATLAB, Vivado High Level Synthesis (Vivado HLS), and the like). The memory 102 further includes a synthesizable logic that converts the MPL code to RTL instructions for synthesizing printf and/or scanf statement(s) comprised in the MPL code. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 3:
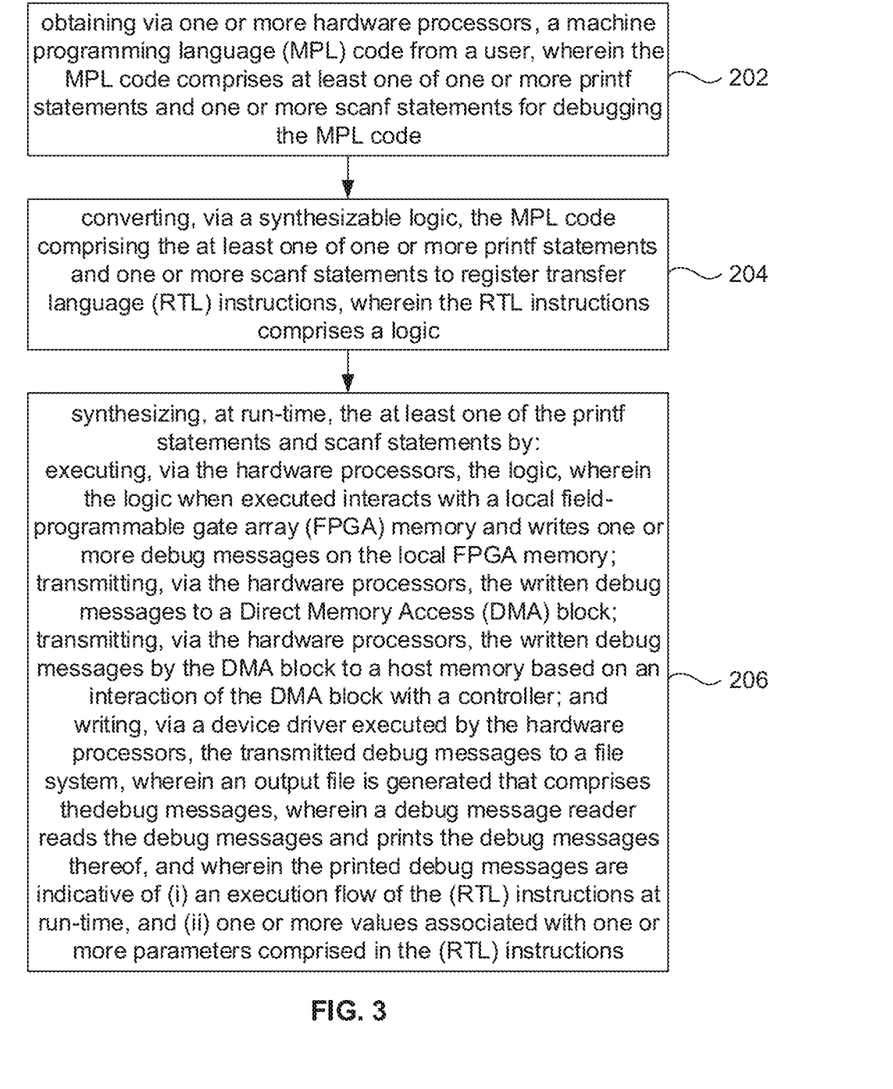
FIG. 3 depicts an exemplary flow chart for synthesizing at least one of printf and scanf statements for generating debug messages in High-Level Synthesis (HLS) code using the system of FIG. 2, in accordance with an embodiment of the present disclosure.
Figure 4A:
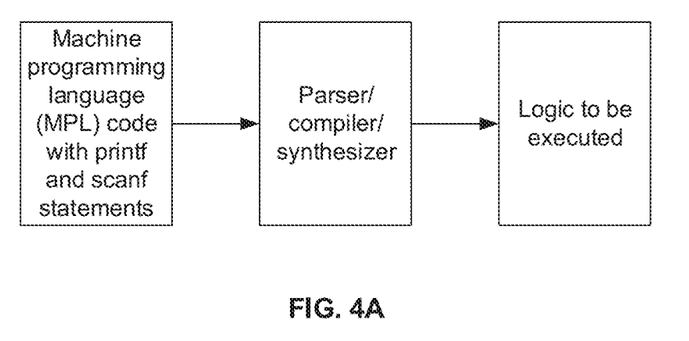
FIGS. 4A through 4C depict an exemplary functional block diagram for synthesizing printf and/or scanf statements for generating debug messages in High-Level Synthesis (HLS) code as implemented by the system of FIG. 2, in accordance with an embodiment of the present disclosure.
Figure 4B:
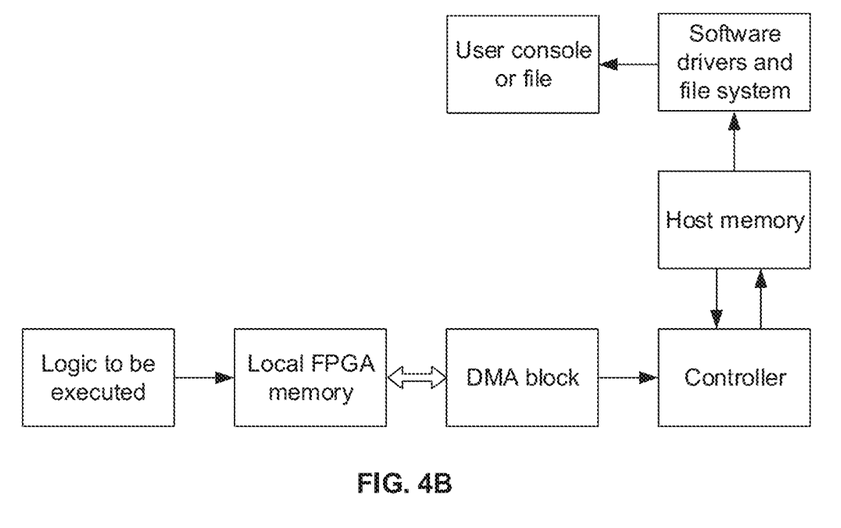

FIG. 3, with reference to FIG. 2, depicts an exemplary flow chart for synthesizing at least one of printf and scanf statements for generating debug messages in High-Level Synthesis (HLS) code using the system 100 of FIG. 2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. FIGS. 4A-4B, with reference to FIGS. 2-3, depict an exemplary functional block diagram for synthesizing printf and/or scanf statements for generating debug messages in High-Level Synthesis (HLS) code, in accordance with an embodiment of the present disclosure. In the present disclosure, High-Level Synthesis can also be referred as High-level synthesis (HLS) and may be interchangeably used hereinafter. The steps of the method of the present disclosure will now be explained with reference to components of the system 100 of FIG. 2, the flow diagram as depicted in FIG. 3, and the block diagram of FIGS. 4A-4B. At step 202 of the present disclosure, the one or more hardware processors 104 obtain a machine programming language (MPL) code from a user. In the present disclosure, the MPL code comprises at least one of one or more printf and/or one or more scanf statements for debugging the MPL code. In an embodiment of the present disclosure, the one or more printf and/or scanf statements are specified before or after at least one of (i) one or more functions and (ii) one or more sections having instructions comprised in the MPL code. In an embodiment of the present disclosure, printf statements refer to a procedure in which data is displayed on display screen (or console). In an embodiment of the present disclosure, scanf statements refer to a procedure wherein input is obtained from user and given to programming code (MPL code). Further, the MPL code can be written using any programming language, for example, but are not limited to C, C++, SystemC, simulator such as MATLAB, Vivado HLS, and the like. For the sake of brevity and for better understanding of the embodiments of the present disclosure, a simple machine programming language code is considered and is illustrated by way of example below:

```
//Programming code //
void add_function(int a, int b, int &c)
{
int response;
c=a+b;
printf("c=%d", c);
printf("shall we proceed?");
scanf("%d", &response);
if (response==1)
    return;
else
    exit (0);
}
```

At step 204 of the present disclosure, a synthesizable logic 110 converts the MPL code comprising at least one of the one or more printf statements and the one or more scanf statements to register transfer language (RTL) instructions. The RTL instructions comprises a logic. The logic includes instructions set (RTL code) for communicating with console (or display screen or display device). In the present disclosure, the synthesizable logic 110 is comprised in the memory 102.

```
//==================================================
RTL generated by Vivado™ HLS—High-Level Synthesis
    from C, C++ and SystemC
// Version: 2017.3
// Copyright© 1986-2017 Xilinx, Inc. All Rights Reserved.
//==================================================
'timescale 1 ns/1 ps
(*
CORE_GENERATION_INFO="add_function,
    hls_ip_2017_3,{HLS_INPUT_TYPE=cxx,H
    LS_INPUT_FLOAT=0,HLS_INPUT_FIXED=0,
    HLS_INPUT_PART=xcvu9p-flga2104-2L-e-
    es1,HLS_INPUT_CLOCK=3.000000,
    HLS_INPUT_ARCH=others,HLS_SYN_CLOCK=0.
    880000,HLS_SYN_LAT=0,HLS_SYN_TPT=none,
    HLS_SYN_MEM=0,HLS_SYN_DSP=0,
    HLS_SYN_FF=0,HLS_SYN_LUT=39}" *)
module add_function (
    ap_start,
    ap_done,
    ap_idle,
    ap_ready,
    a,
    b,
    c,
    c_ap_vld
);
input ap_start;
output ap_done;
output ap_idle;
output ap_ready;
input [31:0] a;
input [31:0] b;
output [31:0] c;
output c_ap_vld;
reg c_ap_vld;
always @ (*) begin
    if ((ap_start==1'b1)) begin
        c_ap_vld=1'b1;
    end else begin
        c_ap_vld=1'b0;
    end
end
assign ap_done=ap_start;
assign ap_idle=1'b1;
assign ap_ready=ap_start;
assign c=(b+a);
end module //add_function
```

In the above RTL instructions, it is shown how an add_function logic looks like (or written).

Figure 4C:
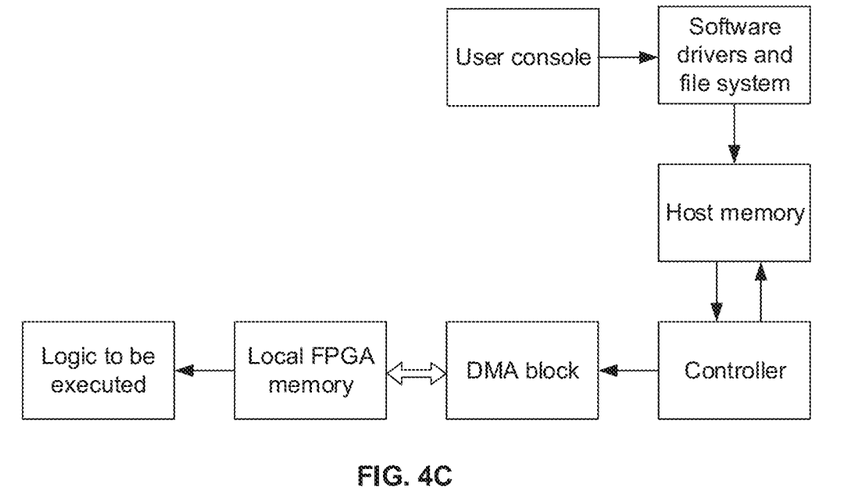

At step 206 of the present disclosure, the one or more hardware processors 104 synthesize, at run-time, the one or more printf statements and/or the one or more scanf statements by: executing the logic, wherein the logic when executed interacts with a local field-programmable gate array (FPGA) memory and writes one or more debug messages on the local FPGA memory; transmitting the one or more written debug messages to a Direct Memory Access (DMA) block (as shown in FIG. 4B and as implemented by the system 100 of FIG. 2); transmitting the one or more written debug messages by the DMA block to a host memory based on an interaction of the DMA block with a controller (as shown in FIG. 4B-4C and as implemented by the system 100 of FIG. 2), wherein the controller is a peripheral component interconnect express (PCI-e) hard macro controller; and writing, via a device driver 112 executed by the one or more hardware processors, the one or more transmitted debug messages to a file system. In the present disclosure, the device driver 112 is comprised in the memory 102. The steps 202 and 204 are further depicted in FIG. 4A-4C. An output file is generated that comprises the one or more debug messages. A debug message reader 114 comprised in the memory 102 or a FPGA card of host (e.g., the system 100) reads the one or more debug messages and prints the one or more debug messages thereof. In the present disclosure, the one or more debug messages are written in a High-level synthesis (HLS) code. The printed one or more debug messages are indicative of (i) an execution flow of the RTL instructions at run-time, and (ii) one or more values associated with one or more parameters comprised in the (RTL) instructions. In the case of scanf statement, requisite data is provided by the user (or data entered by user) via console as depicted in FIG. 4C. More specifically, FIG. 4C depicts a functional block diagram for synthesizing scanf statement(s) in accordance with an embodiment of the present disclosure. As can be seen in FIG. 4C, the requisite data is then sent to the driver/file system. This then goes to the Host memory. The PCIe hardmacro reads the data from the host memory. DMA Block reads the input data and writes it to the FPGA memory. The logic to be executed now reads the data from the local FPGA memory. Based on the input from user, the corresponding action is taken by the logic to be executed.

Example of sample C code which depicts an execution flow of RTL instructions at run-time is illustrated below:

```
// sample C code
int sample_function( )
{
int i,j,k;
for(i=0;i<2;i++)
  {
    for(j=0;j<3;j++)
    {
      printf("\n I=%d . . . j=%d", i. j);
    }
  }
}
```

Sample outputs are derived from above sample C code could be as shown below:

```
// sample output
I=0; j=0
I=0; j=1
I=0; j=2
I=0; j=0
I=0; j=1
I=0; j=2
```

The RTL code will not print the above statements as they do not have the synthesizable printf and/or scanf statements. However, the above example shows how variables can be observed on screen based on what is displayed by the printf statement/scanf statement. The debug messages also include error(s), if any, where exactly these are occurring during runtime. For instance, there could be a 'for' loop say to be executed for say cm' times, but during the run-time execution the debug message showed that it successfully got executed for only 'n' times and did not run for remaining 'm-n' times. This level of error prediction or observation is derivable using the system 100 of the present disclosure whereas it is challenge in the current existing scenarios or conventional approaches.

Following is a sample code where printf/scanf could be used for debugging:

```
int main( )
{
int i=0;
int k=0;
int response;
for(i=0;i<10;i++)
    {
       printf("\n Calling some function");
       some_function( );
       printf("\n Back from the function");
       printf("\n this is iteration number %d", k);
       k=k+1;
    printf("\n Shall I proceed to the next iteration?");
       scanf("%d",&response);
       if(response==1) continue;
       else break;
       }
}
```

In the above function, it can be observed that that some_function( ) is called 10 times in a for loop. While executing, it is possible that there is some problem inside/within some_function( ) due to which the program terminates after say 3 function calls. The systems and methods of the present disclosure enable debugging whether some_function( ) gets executed 10 times and if not then at what iteration it terminates. From the code, it may look obvious that the function will be called 10 times, but however, during run-time execution it may so happen that only 3 times function gets invoked and the remaining 7 times it fails to. The embodiments of the present disclosure enable correct debugging by inclusion of printf and/or scanf statements before and after calls to some_function and synthesizing these printf/scanf statements. So, on running the above code, the system 100 generates debug message(s) that has 10 printf (or scanf) statements. If there is some problem, then there will be printing of only 3 times. Thus, from the above implementation by the embodiments of the present disclosure, it can be observed that the code had problem/issues after 3 iterations wherein the method of the present disclosure enables tracing what went wrong with the program after third iteration. Further by implementation of the method of the present disclosure, system provides control over whether a user would want to continue to the execution of next iteration based on the input provided by the user. In this case, a response from the user is taken in a variable "response". If response is 1, then the program code is allowed to go to the next iteration. If response is not 1, then the execution comes out of the loop.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
obtaining, via one or more hardware processors, a machine programming language (MPL) code from a user, wherein the MPL code comprises at least one of one or more printf statements and one or more scanf statements for debugging the MPL code;
converting, via a synthesizable logic, the MPL code comprising the at least one of one or more printf statements and one or more scanf statements to register transfer language (RTL) instructions, wherein the RTL instructions comprise a logic, wherein the one or more printf statements refer to a procedure in which data is displayed on display screen or console, and one or more scanf statements refer to a procedure in which an input is obtained from user and given to the MPL code, wherein the logic includes a RTL code for communicating with the display screen or the console; and
synthesizing, at run-time, the at least one of one or more printf statements and one or more scanf statements by:
executing, via the one or more hardware processors, the logic, wherein the logic when executed interacts with a local field-programmable gate array (FPGA) memory and writes one or more debug messages on the local FPGA memory;
transmitting, via the one or more hardware processors, the one or more written debug messages to a Direct Memory Access (DMA) block;
transmitting, via the one or more hardware processors, the one or more written debug messages by the DMA block to a host memory based on an interaction of the DMA block with a controller;
writing, via a device driver executed by the one or more hardware processors, the one or more transmitted debug messages to a file system, wherein an output file is generated that comprises the one or more debug messages, wherein a debug message reader reads the one or more debug messages and prints the one or more debug messages thereof, and wherein the printed one or more debug messages are indicative of (i) an execution flow of the RTL instructions at run-time, and (ii) one or more values associated with one or more parameters comprised in the RTL instructions, wherein the one or more debug messages include one or more errors and indicate an exact occurrence of the one or more errors in the RTL code during run-time;
obtaining requisite data from the user for the one or more scanf statements through the console and the synthesizing of the one or more scanf statements starts with sending the requisite data to the file system and then transmitting the requisite data to the host memory; and
reading, by the controller, the requisite data from the host memory, and further reading by the DMA block an input data and writing the input data to the local FPGA memory, and wherein the logic to be executed now reads the input data from the local FPGA memory and based on the input from the user, corresponding action is taken by the logic to be executed, and
wherein while executing the RTL code an error occurs within one or more functions which causes the MPL code to terminate after a predefined function is called, debugging is enabled by including the printf and/or the scanf statements before and after the calls to the one or more functions and synthesizing the printf and/or scanf statements, and then upon running the RTL code, generating the one or more debug messages with a predetermined number of the printf statement or the scanf statement.

2. The processor implemented method of claim 1, wherein the one or more printf statements are one or more High-level synthesis (HLS) printf statements, and wherein the one or more scanf statements are one or more HLS scanf statements.

3. The processor implemented method of claim 1, wherein the controller is a peripheral component interconnect express (PCI-e) hard macro controller.

4. The processor implemented method of claim 1, wherein the one or more debug messages are written in a High-level synthesis (HLS) code.

5. The processor implemented method of claim 1, wherein the method further comprising obtaining a response from the user to perform one of continue execution of a next iteration in the MPL code if the response indicates 1 or execution coming out of a loop if the response indicates not 1, thereby providing control over whether the user wants to continue to the execution of the next iteration.

6. A system, comprising:
a memory storing instructions;
one or more communication interfaces;
one or more hardware processors coupled to the memory via the one or more communication interfaces, wherein the one or more hardware processors are configured by the instructions to:
obtain a machine programming language (MPL) code from a user, wherein the MPL code comprises at least one of one or more printf statements and one or more scanf statements for debugging the MPL code; and
a synthesizable logic that converts the MPL code comprising the at least one of one or more printf statements and one or more scanf statements to register transfer language (RTL) instructions, wherein the RTL instructions comprise a logic, wherein the one or more printf statements refer to a procedure in which data is displayed on display screen or console, and one or more scanf statements refer to a procedure in which an input is obtained from user and given to the MPL code, wherein the logic includes a RTL code for communicating with the display screen or the console,
wherein the one or more hardware processors synthesize, at run-time, the at least one of one or more printf statements and one or more scanf statements by:
executing, the logic, wherein the logic when executed interacts with a local field-programmable gate array (FPGA) memory and writes one or more debug messages on the local FPGA memory;
transmitting the one or more written debug messages to a Direct Memory Access (DMA) block;
transmitting the one or more written debug messages by the DMA block to a host memory based on an interaction of the DMA block with a controller;
writing, via a device driver executed by the one or more hardware processors, the one or more transmitted debug messages to a file system, wherein an output file is generated that comprises the one or more debug messages, and wherein a debug message reader comprised in the system reads the one or more debug messages and prints the one or more debug messages thereof at run time, and wherein the printed one or more debug messages are indicative of (i) an execution flow of the RTL instructions at run time, and (ii) one or more values associated with one or more parameters comprised in the RTL instructions, wherein the one or more debug messages include one or more errors and indicate an exact occurrence of the one or more errors in the RTL code during run-time;

obtaining requisite data from the user for the one or more scanf statements through the console and the synthesizing of the one or more scanf statements starts with sending the requisite data to the file system and then transmitting the requisite data to the host memory; and reading, by the controller, the requisite data from the host memory, and further reading by the DMA block an input data and writing the input data to the local FPGA memory, and wherein the logic to be executed now reads the input data from the local FPGA memory and based on the input from the user, corresponding action is taken by the logic to be executed, and wherein while executing the RTL code an error occurs within one or more functions which causes the ML code to terminate after a predefined function is called debugging is enabled by including the printf and/or the scanf statements before and after the calls to the one or more functions and synthesizing the printf and/or scanf statements, and then upon running the RTL code, generating the one or more debug messages with a predetermined number of the printf statement or the scanf statement.

7. The system of claim 4, wherein the one or more printf statements are one or more High-level synthesis (HLS) printf statements, and wherein the one or more scanf statements are one or more High-level synthesis (HLS) scanf statements.

8. The system of claim 4, wherein the controller is a peripheral component interconnect express (PCI-e) hard macro controller.

9. The system of claim 4, wherein the one or more debug messages are written in a High-level synthesis (HLS) code.

10. The system of claim 4, wherein the one or more hardware processors are configured by the instructions to obtain a response from the user to perform one of continue execution of a next iteration in the MPL code if the response indicates 1 or execution coming out of a loop if the response indicates not 1, thereby providing control over whether the user wants to continue to the execution of the next iteration.

11. One or more non-transitory machine-readable information storage mediums comprising one or more instructions which when executed by one or more hardware processors cause synthesizing printf statements for generating debug messages in High-Level Synthesis (HLS) code by:

obtaining, via the one or more hardware processors, a machine programming language (MPL) code from a user, wherein the MPL code comprises the at least one of one or more printf statements and one or more scanf statements for debugging the MPL code;

converting, via a synthesizable logic, the MPL code comprising the at least one of one or more printf statements and one or more scanf statements to register transfer language (RTL) instructions, wherein the RTL instructions comprise a logic, wherein the one or more printf statements refer to a procedure in which data is displayed on display screen or console, and one or more scanf statements refer to a procedure in which an input is obtained from user and given to the MPL code, wherein the logic includes a RTL code for communicating with the display screen or the console; and synthesizing, at run-time, the at least one of one or more printf statements and one or more scanf statements by:

executing, via the one or more hardware processors, the logic, wherein the logic when executed interacts with a local field-programmable gate array (FPGA) memory and writes one or more debug messages on the local FPGA memory;

transmitting, via the one or more hardware processors, the one or more written debug messages to a Direct Memory Access (DMA) block;

transmitting, via the one or more hardware processors, the one or more written debug messages by the DMA block to a host memory based on an interaction of the DMA block with a controller;

writing, via a device driver executed by the one or more hardware processors, the one or more transmitted debug messages to a file system, wherein an output file is generated that comprises the one or more debug messages, wherein a debug message reader reads the one or more debug messages and prints the one or more debug messages thereof, and wherein the printed one or more debug messages are indicative of (i) an execution flow of the RTL instructions, and (ii) one or more values associated with one or more parameters comprised in the RTL instructions, wherein the one or more debug messages include one or more errors and indicate an exact occurrence of the one or more errors in the RTL code during run-time;

obtaining requisite data from the user for the one or more scanf statements through the console and the synthesizing of the one or more scanf statements starts with sending the requisite data to the file system and then transmitting the requisite data to the host memory; and reading, by the controller, the requisite data from the host memory, and further reading by the DMA block an input data and writing the input data to the local FPGA memory, and wherein the logic to be executed now reads the input data from the local FPGA memory and based on the input from the user, corresponding action is taken by the logic to be executed, and wherein while executing the RTL code an error occurs within one or more functions which causes the MPL code to terminate after a predefined function is called debugging is enabled by including the printf and/or the scanf statements before and after the calls to the one or more functions and synthesizing the printf and/or scanf statements, and then upon running the RTL code, generating the one or more debug messages with a predetermined number of the printf statement or the scanf statement.

12. The one or more non-transitory machine-readable information storage mediums of claim 8, wherein the one or more printf statements are one or more High-level synthesis (HLS) printf statements, and wherein the one or more scanf statements are one or more HLS scanf statements.

13. The one or more non-transitory machine-readable information storage mediums of claim 8, wherein the controller is a peripheral component interconnect express (PCI-e) hard macro controller.

14. The one or more non-transitory machine-readable information storage mediums of claim 8, wherein the one or more debug messages are written in a High-level synthesis (HLS) code.

15. The one or more non-transitory machine-readable information storage mediums of claim 8, wherein the one or more hardware processors causes obtaining a response from the user to perform one of continue execution of a next iteration in the MPL code if the response indicates 1 or execution coming out of a loop if the response indicates not 1, thereby providing control over whether the user wants to continue to the execution of the next iteration.

\* \* \* \* \*